United States Patent
White (10) Patent No.: US 11,034,463 B2
(45) Date of Patent: Jun. 15, 2021

(54) AIRCRAFT AUXILIARY POWER UNIT (APU) CONTROL SYSTEM HAVING VARIABLY SIZED AIR INLET

(71) Applicant: The Boeing Company, Chicago, IL (US)

(72) Inventor: Jeffrey J. White, Shoreline, WA (US)

(73) Assignee: The Boeing Company, Chicago, IL (US)

( * ) Notice: Subject to any disclaimer, the term of this patent is extended or adjusted under 35 U.S.C. 154(b) by 269 days.

(21) Appl. No.: 16/364,523

(22) Filed: Mar. 26, 2019

(65) Prior Publication Data

US 2020/0307822 A1  Oct. 1, 2020

(51) Int. Cl.
  B64D 41/00  (2006.01)
  F01D 17/04  (2006.01)
  F01D 17/08  (2006.01)
(52) U.S. Cl.
  CPC ............ B64D 41/00 (2013.01); F01D 17/04 (2013.01); F01D 17/08 (2013.01)
(58) Field of Classification Search
  CPC .................................................. B64D 41/00
  See application file for complete search history.

(56) References Cited

U.S. PATENT DOCUMENTS

| | | | |
|---|---|---|---|
| 6,163,078 A | 12/2000 | Utamura | |
| 6,777,822 B1 | 8/2004 | Suttie et al. | |
| 7,367,193 B1 | 5/2008 | Thompson | |
| 7,469,545 B2 * | 12/2008 | Riley | B64D 41/00 244/53 B |
| 8,061,650 B2 * | 11/2011 | Nguyen | B64D 41/00 244/58 |
| 9,327,600 B1 * | 5/2016 | Nehmeh | B64D 41/00 |
| 9,611,050 B2 * | 4/2017 | Tretow | B64D 33/02 |
| 10,239,632 B2 * | 3/2019 | Manoukian | B64D 41/00 |
| 10,273,823 B2 * | 4/2019 | Marcus | B64D 33/02 |
| 10,482,690 B2 * | 11/2019 | Jordan | G08G 5/0013 |
| 2003/0126864 A1 | 7/2003 | Thompson | |
| 2008/0058998 A1 | 3/2008 | Breit | |

(Continued)

FOREIGN PATENT DOCUMENTS

EP  3101252 A1  12/2016
EP  3179077 A1  6/2017

OTHER PUBLICATIONS

Notice of Allowance dated Sep. 25, 2020, U.S. Appl. No. 16/260,305.

(Continued)

*Primary Examiner* — Alex C Dunn (57) ABSTRACT

An auxiliary power unit (APU) control system for an aircraft is disclosed and includes an APU, an air inlet having an effective area, an air inlet door moveable to vary the effective area of the air inlet, an actuator configured to move the air inlet door into a set position, one or more processors, and a memory coupled to the one or more processors. The memory stores data comprising a database and program code that, when executed by the one or more processors, causes the APU control system to receive one or more ambient signals indicative of an air density value. The system also determines the effective area of the air inlet based on the air density value. The system is further caused to instruct the actuator to move the air inlet door into the set position.

20 Claims, 7 Drawing Sheets

(56) References Cited

U.S. PATENT DOCUMENTS

| | | | |
|---|---|---|---|
| 2008/0279675 A1* | 11/2008 | Ullyott | F02C 9/46 415/1 |
| 2010/0293961 A1* | 11/2010 | Tong | F01D 19/00 60/778 |
| 2011/0054718 A1 | 3/2011 | Bailey | |
| 2013/0074519 A1* | 3/2013 | Ertz | F02C 9/16 60/802 |
| 2013/0204544 A1 | 8/2013 | Thomas | |
| 2015/0205302 A1 | 7/2015 | Buisson et al. | |
| 2015/0251770 A1* | 9/2015 | Bisson | B64D 35/08 244/58 |
| 2015/0283908 A1 | 10/2015 | Himmelmann | |
| 2016/0075442 A1 | 3/2016 | Ahmad et al. | |
| 2016/0090915 A1* | 3/2016 | Wolff | B64D 41/00 60/794 |
| 2016/0137307 A1 | 5/2016 | Fernandez | |
| 2016/0355275 A1* | 12/2016 | Seger | B64D 41/00 |
| 2016/0376021 A1 | 12/2016 | Ullyott et al. | |
| 2016/0376022 A1 | 12/2016 | Ullyott et al. | |
| 2016/0376023 A1 | 12/2016 | Ullyott et al. | |
| 2016/0376981 A1 | 12/2016 | Ullyott et al. | |
| 2017/0036768 A1* | 2/2017 | Stieger | B64D 13/04 |
| 2017/0037774 A1 | 2/2017 | Jones et al. | |
| 2017/0037775 A1 | 2/2017 | Jones et al. | |
| 2017/0335711 A1* | 11/2017 | Marcus | F01D 17/12 |
| 2018/0170564 A1 | 6/2018 | Vaillant et al. | |
| 2018/0187601 A1* | 7/2018 | Segura Martinez De Ilarduya et al. | F01D 25/20 |
| 2020/0239156 A1* | 7/2020 | White | F01D 15/10 |

OTHER PUBLICATIONS

Notice of Allowance dated Dec. 14, 2020, U.S. Appl. No. 16/260,305.

Non-Final Rejection dated Aug. 20, 2020, U.S. Appl. No. 16/260/307.

EP, Extended European Search Report, Application No. 20154043.2-1007, pp. 3-9, Jun. 19, 2020.

EP, Extended European Search Report, Application No. 20154041.1-1010, pp. 3-7, Jun. 15, 2020.

\* cited by examiner

AIRCRAFT AUXILIARY POWER UNIT (APU) CONTROL SYSTEM HAVING VARIABLY SIZED AIR INLET

INTRODUCTION

The present disclosure relates to an auxiliary power unit (APU) control system for an aircraft. More particularly, the disclosure relates to an APU control system for varying an effective area of an air inlet to maintain a substantially constant power output of the APU.

BACKGROUND

An aircraft may be equipped with an auxiliary power unit (APU) in the form of a gas turbine. In some types of larger commercial aircraft, the APU provides electrical power as well as bleed air. The bleed air is extracted from the load compressor of the APU. However, the APU is limited to providing bleed air only on the ground and at very low altitudes. In the alternative, an electrically propelled aircraft includes an APU that only provides electrical power. The APU of an electrically propelled aircraft does not include a load compressor, and therefore does not provide bleed air. Although an electrically propelled aircraft is discussed, this approach is also used on an aircraft that utilizes electrical power for all non-propulsive systems as well.

The APU includes a compressor, a combustor, and a turbine. During operation of the APU, the compressor draws in ambient air that is compressed and sent to the combustor. Specifically, the ambient air enters through an intake opening and travels through an inlet duct to the compressor of the APU. An intake door may be positioned adjacent to the intake opening and is opened and closed by an actuator. The intake door moves between a fully closed position, a partially opened position, and a fully opened position. When the air inlet door is in the fully closed position, the inlet door seals the air intake and prevents air from flowing into and through the inlet duct to the APU. The intake door is usually in the fully opened position while on ground and is in either the partially opened position or the fully closed position while in flight.

The power output and efficiency of a gas turbine depend upon ambient conditions such as altitude, air temperature, humidity, and air density. Specifically, the reduction in the power output of a gas turbine is proportional to an increase in altitude. As an example, the air density at sea level is about four times denser when compared to 40,000 feet (about 12,192 meters) altitude. A reduction in air density also decreases the air mass flow rate into the gas turbine. Consequently, the gas turbine is only able to produce about one-fourth the power at 40,000 feet altitude compared to sea level.

Existing APUs found in an aircraft are typically oversized to accommodate potential shock loads, which occur when the load demand increases by a significant amount within a very short period of time. More specifically, the turbine is sized to have sufficient rotor inertia so that a shock load does not cause the rotational speed to droop below a predetermined frequency. However, an oversized APU results in increased mass to the aircraft.

SUMMARY

According to several aspects, an auxiliary power unit (APU) control system for an aircraft is disclosed. The APU control system includes an APU, an air inlet having an effective area, an air inlet door moveable to vary a size of the effective area of the air inlet, and an actuator configured to move the air inlet door into a set position, one or more processors, and a memory coupled to the one or more processors. The memory stores data comprising a database and program code that, when executed by the one or more processors, causes the APU control system to receive one or more ambient signals indicative of an air density value and one or more power signals indicative of a specific amount of power generated by the APU. The APU control system is also caused to determine the size of the effective area of the air inlet based on the air density value, where a mass flow of ambient air provided to the APU is proportional to the size of the effective area of the air inlet. The APU control system determines the set position of the air inlet door based on the size of the effective area of the air inlet. The APU control system is then caused to instruct the actuator to move the air inlet door into the set position, where the APU continues to generate the specific amount of power when the air inlet door is in the set position.

According to yet another aspect of the disclosure, a method of adjusting a set position of an air inlet door that is part of an APU control system is disclosed. The method includes receiving, by a computer, one or more ambient signals indicative of an air density value and one or more power signals indicative of a specific amount of power generated by an APU. The method also includes determining, by the computer, an effective area of an air inlet based on the air density value, where a mass flow of ambient air provided to the APU is proportional to a size of the effective area of the air inlet. The method also includes determining the set position of the air inlet door based on the effective area of the air inlet. The air inlet door is moveable to vary the size of the effective area of the air inlet. Finally, the method includes instructing an actuator to move the air inlet door into the set position. The APU continues to generate the specific amount of power when the air inlet door is in the set position.

The features, functions, and advantages that have been discussed may be achieved independently in various examples or may be combined in other examples further details of which can be seen with reference to the following description and drawings.

BRIEF DESCRIPTION OF THE DRAWINGS

The drawings described herein are for illustration purposes only and are not intended to limit the scope of the present disclosure in any way.

DETAILED DESCRIPTION

The disclosure is directed towards an auxiliary power unit (APU) control system for an aircraft, where the APU is a gas turbine. The APU control system includes an air inlet having an effective area, an air inlet door moveable to vary the effective area of the air inlet, and an actuator configured to move the air inlet door into a set position. Specifically, the air inlet door is moveable by the actuator between a fully opened position, a fully closed position, and a plurality of partially opened positions. The APU control system varies the set position of the air inlet door while maintaining a substantially constant power output, even as ambient conditions and operating parameters of the aircraft that affect the performance of the APU change. Specifically, changes in ambient conditions such as air density, air temperature, humidity, and altitude may adversely affect the performance of the APU.

For example, as the aircraft increases in altitude the air density decreases, which in turn reduces the mass flow air provided to the APU. The APU control system compensates for the reduction air density by adjusting the set position of the air inlet door. Therefore, the power output of the APU remains substantially constant even as the inlet air density decreases. In addition to air density, the APU control system also adjusts the set position of the air inlet door based on other ambient conditions such as aircraft velocity and humidity.

The APU control system also adjusts the set position of the air inlet door based on based on the electrical load demand, which in turn improves the efficiency of the APU. Accordingly, the disclosed APU control system may require a smaller APU to perform the same function as a conventional APU control system. Specifically, conventional APU systems simply move the air inlet door into a fully opened position, a fully closed position, or a single partially opened position. Furthermore, conventional APU control systems do not position the air inlet door to be at worst case flight conditions (e.g., maximum load). Instead, the partially opened position herein simply represents any position of the air inlet door between the fully opened position and the fully closed position to improve or enhance the efficiency of the APU. Furthermore, the set position of the air inlet door is also determined based on a reduced amount of drag that is created as the air inlet door is opened.

The following description is merely exemplary in nature and is not intended to limit the present disclosure, application, or uses.

Figure 1:
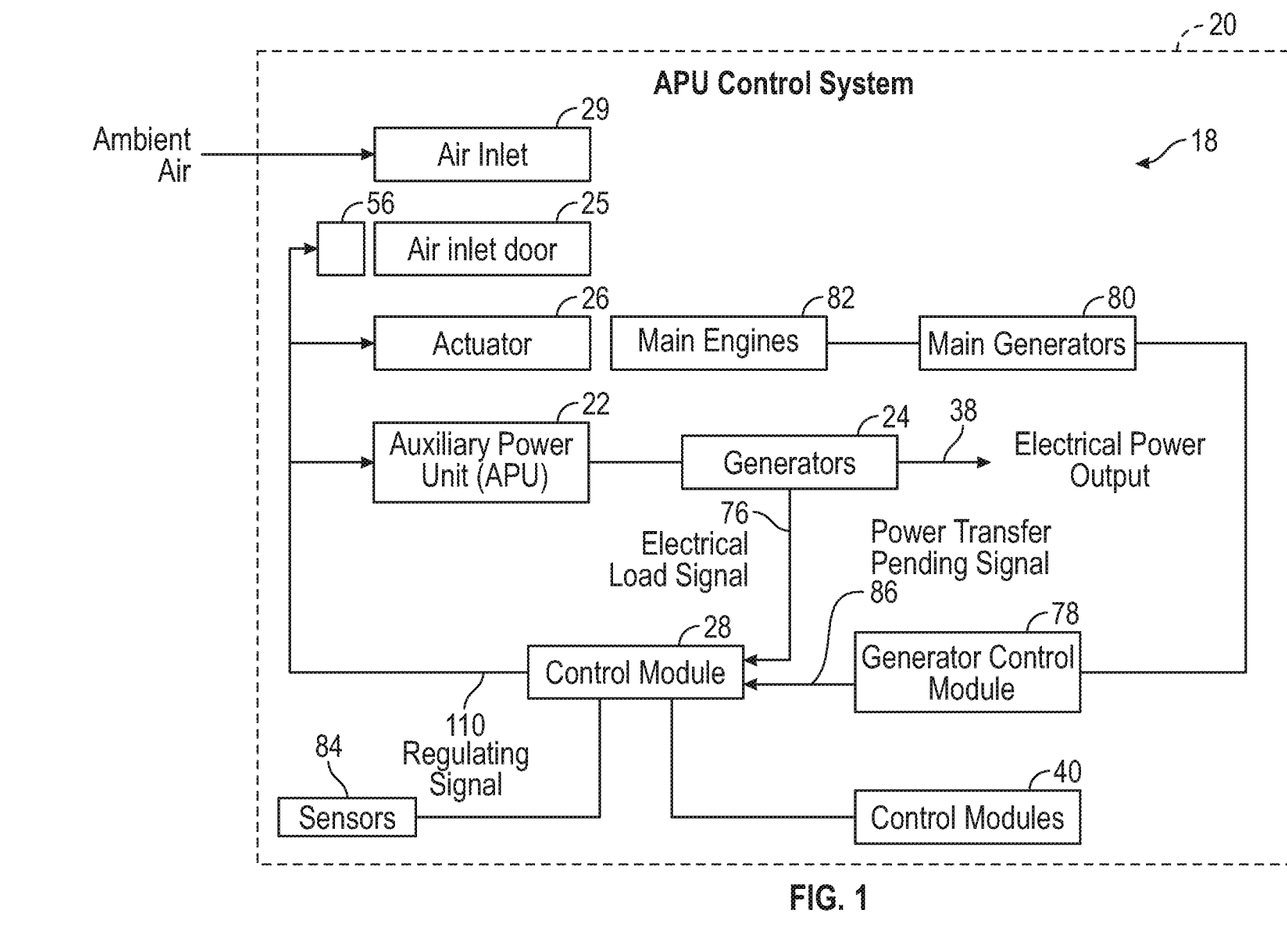
FIG. 1 is a schematic diagram of an aircraft including the disclosed auxiliary power unit (APU) according to an exemplary example.

Referring to FIG. 1, a schematic illustration of an auxiliary power unit (APU) control system 18 for an aircraft 20 is shown. The APU control system 18 includes an APU 22, one or more generators 24 that are driven by the APU 22, an air inlet door 25, an actuator 26 configured to move the air inlet door 25 into a set position, and a control module 28. The control module 28 is in electrical communication with the APU 22, the generators 24, and the actuator 26. The APU 22 is a gas turbine configured to convert fuel into mechanical energy. Although FIG. 1 illustrates one or more generators 24 drivingly coupled to the APU 22, it is to be appreciated that other devices may be driven by the APU 22 as well. For example, devices such as air compressors or hydraulic pumps may be drivingly coupled to the APU 22. The control module 28 is also in electrical communication with one or more other control modules 40 in the aircraft 20. In one example, the control modules 40 include a flight computer control module.

The APU control system 18 also includes an air inlet 29. The air inlet 29 includes an effective area representing a size of an opening of the air inlet 29. An amount of ambient air drawn into the APU 22 depends upon the effective area of the air inlet 29. Specifically, as the effective area of the air inlet 29 decreases, less ambient air is drawn into the APU 22. Likewise, as the effective area of the air inlet 29 increases, more ambient air is drawn into the APU 22. The ambient air enters through the air inlet 29, through one or more air ducts (not shown), and is drawn in by a load compressor 48 and a power compressor 42 of the APU 22 (seen in FIG. 2). The air inlet 29 may include a variety of different configurations. Specifically, the air inlet 29 includes, but is not limited to, a scoop, a rectangular, or a (National Advisory Committee for Aeronautics) NACA style configuration.

The air inlet door 25 is positioned adjacent to the air inlet 29. The air inlet door 25 is configured to open either inwardly or outwardly with respect to the fuselage of the aircraft 20. The actuator 26 is operatively coupled to the air inlet door 25 to move the air inlet door 25, which in turn varies the effective area of the air inlet 29. Specifically, the air inlet door 25 is moveable by the actuator 26 into a fully closed position, a fully opened position, and a plurality of partially opened positions. When in the fully closed position, the air inlet door 25 seals off the air inlet 29 and substantially prevents the flow of ambient air A into the APU 22. Thus, the effective area of the air inlet 29 is about zero.

The amount of ambient air drawn into the APU 22 increases proportionally with the effective area of the air inlet 29. Thus, the control module 28 determines the set position of the air inlet door 25 based on the effective area of the air inlet 29. The size of the effective area of the air inlet 29 ranges between a maximum area value and a minimum area value. The maximum area value of the air inlet 29 corresponds to the fully opened position of the air inlet door 25, and the minimum area value of the air inlet 29 corresponds to the fully closed position of the air inlet door 25.

It is to be appreciated that the set position of the air inlet door 25 is variable, and a plurality of partially opened positions exist between the fully opened position and the fully closed position. In other words, the actuator 26 moves the air inlet door 25 incrementally between the fully opened position and the fully closed position, thereby modulating the ambient air that is drawn into the APU 22. The effective area of the air inlet 29 also includes a plurality of intermediate values that range between the maximum value and the minimum value. Each intermediate value of the effective area of the air inlet 29 is achieved by moving the air inlet door 25 into a corresponding one of the partially opened positions. Specifically, the actuator 26 is configured to incrementally move the air inlet door 25 into one of the partially opened positions between the fully open position and the fully closed position to achieve a specific intermediate value of the effective area of the air inlet 29.

In one non-limiting example, the air inlet door 25 rotates about a hinge and into the fully closed position, the fully opened position, or one of the partially opened positions. The control module 28 is also in communication with a door position sensor 56. The door position sensor 56 indicates an actual position of the air inlet door 25. For example, the door position sensor 56 may indicate an opening angle of the air inlet door 25. By modulating the set position of the air inlet door 25, the amount of ambient air provided to the APU 22 is adjusted to compensate for various ambient and operating parameters of the aircraft 20 that affect the power output of the APU 22. Specifically, various ambient conditions and operating parameters of the aircraft 20 constantly change when the aircraft 20 is in flight, which in turn affects the power output of the APU.

As the aircraft 20 increases in altitude the air density decreases. The reduction in air density reduces the mass flow air provided to the APU 22. The mass flow rate is expressed as $\dot{m} = \rho V A$, where $\dot{m}$ represents the mass flow rate, A represents area of an opening, and V represents flow velocity. A mass flow rate $\dot{m}$ of the ambient air provided to the APU 22 is proportional to the size of the effective area A of the air inlet 29. Thus, a reduction in air density $\rho$ of the ambient air also decreases the air mass flow rate $\dot{m}$ into the gas turbine. A reduction in the air mass flow rate $\dot{m}$ results in a reduction of power output of the APU 22. Thus, the control module 28 determines a value of the effective area of the air inlet 29 that compensates for the change in the mass flow rate $\dot{m}$ to maintain a substantially constant power output of the APU 22. The control module 28 determines the set position of the air inlet door 25 based on the value effective area of the air inlet 29, and then instructs the actuator 26 to move the air inlet door 25 into the set position to maintain a substantially constant power output of the APU 22.

Although air density is described, it is to be appreciated that the control module 28 also adjusts the size of the air inlet 29 based on other factors as described below. Specifically, the size of effective area of the air inlet 29 may also be adjusted based on the electrical load demand of the generators 24, the velocity of the aircraft 20, the absolute humidity of the ambient air, and a flight plan.

Figure 2:
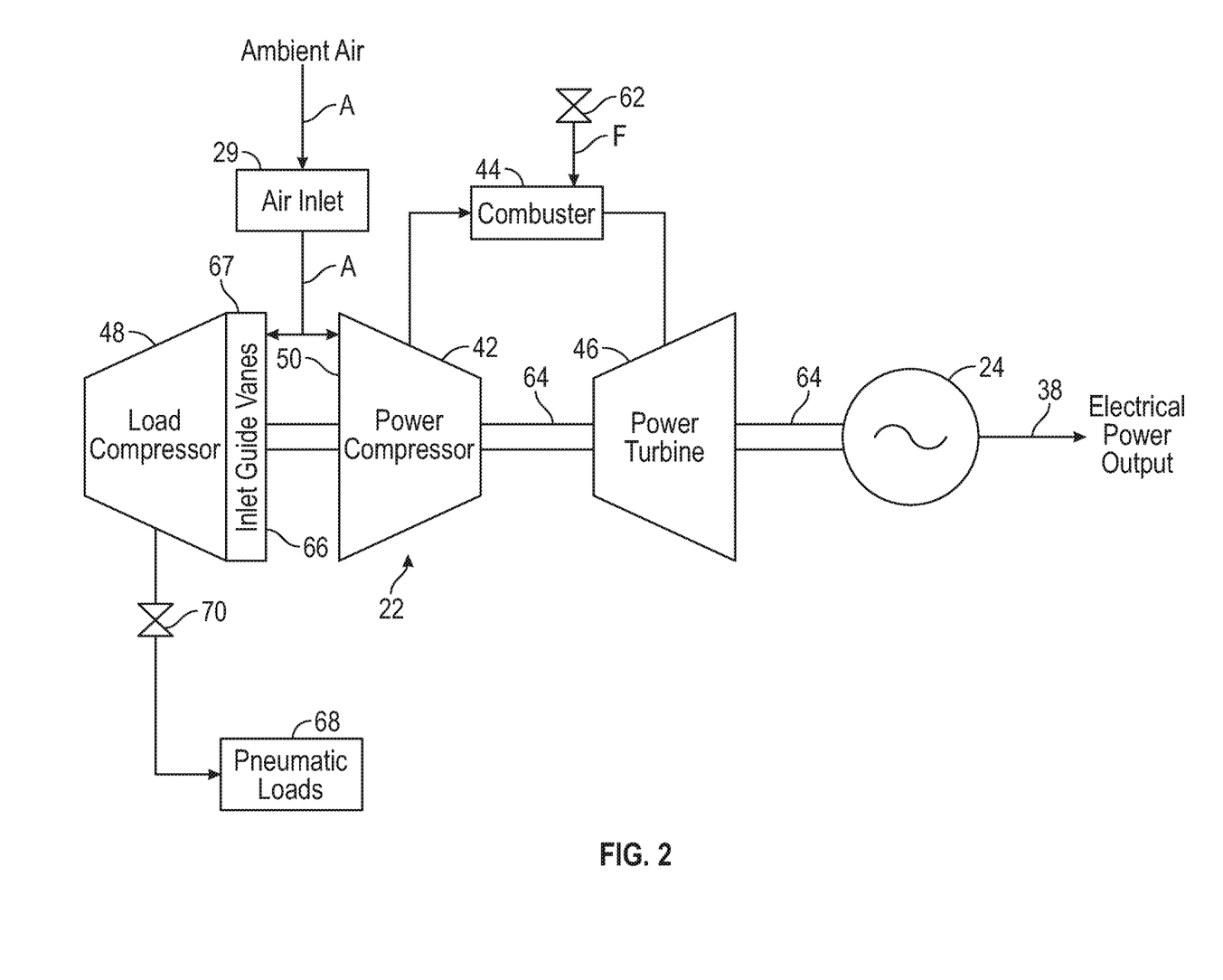
FIG. 2 is a schematic diagram of the APU shown in FIG. 1, where the APU includes a load compressor according to an exemplary example.
Figure 3:
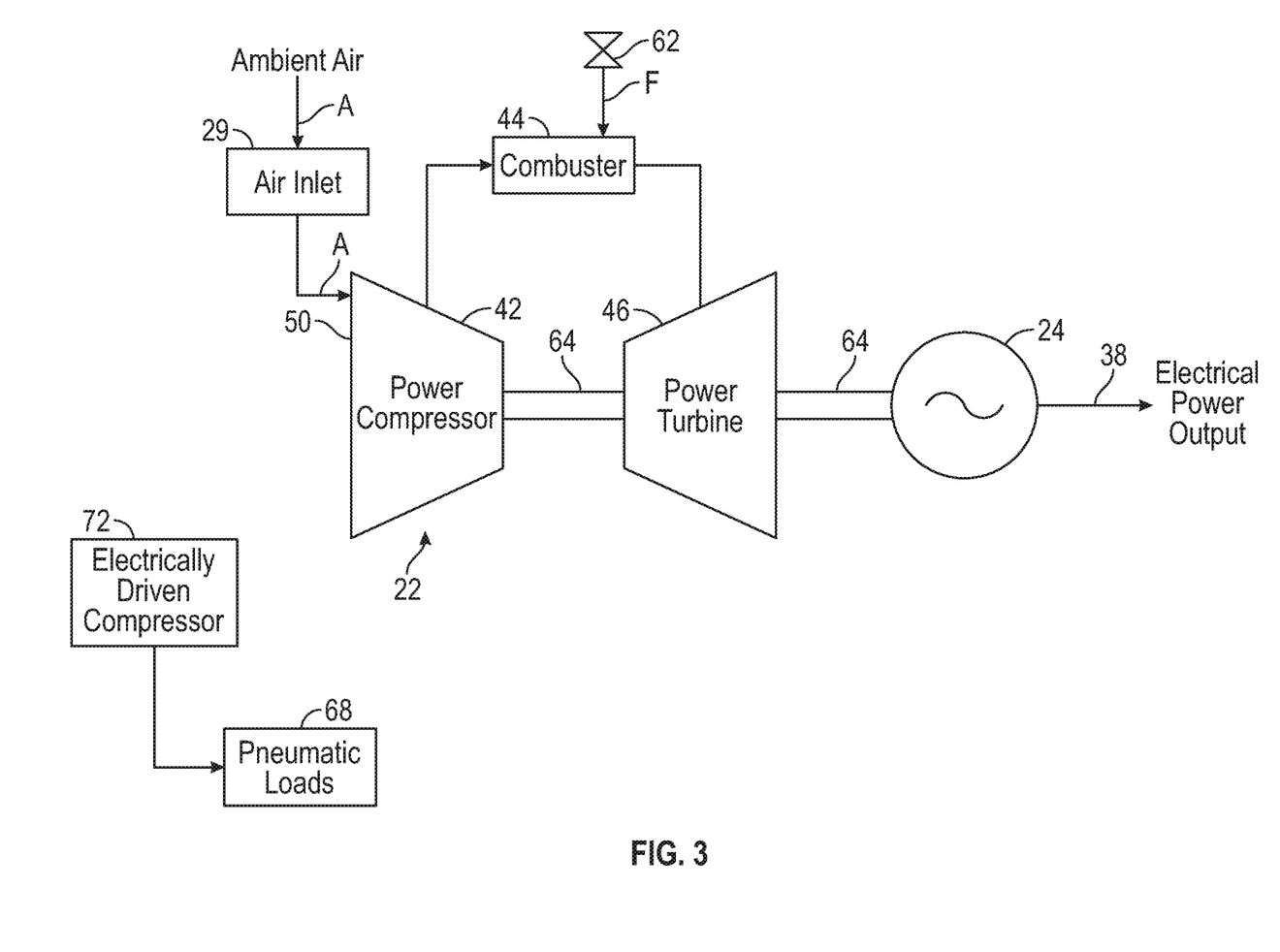
FIG. 3 is a schematic diagram of an alternative APU for an electrically propelled aircraft according to an exemplary example.

FIG. 2 is a schematic diagram of an exemplary example of the APU 22 and the generators 24. In the example as shown in FIG. 2, the APU 22 includes the power compressor 42, a combustor 44, a power turbine 46, and a load compressor 48 that is drivingly coupled to the APU 22. It is to be appreciated that FIG. 2 is merely exemplary in nature and different configurations of gas turbines may be used as well. For example, in the alternative example shown in FIG. 3, the APU 22 does not include a load compressor. As explained below, the APU 22 shown in FIG. 3 is part of an aircraft that does not provide bleed air to one or more pneumatic loads 68 in the aircraft 20, such as an electrically propelled aircraft or an aircraft that utilizes electrical power for all non-propulsive systems. The pneumatic loads 68 include, for example, an environmental control system (ECS), wing anti-ice protection, and main engine starting air for one or more main engines.

Referring back to FIG. 2, during operation of the APU 22, the power compressor 42 draws ambient air A from the air inlet 29 and into a power compressor inlet 50, compresses the ambient air A, and supplies compressed air to the combustor 44. The combustor 44 receives the compressed air from the power compressor 42 and a flow of fuel F from a fuel metering valve 62. The fuel F and compressed air are mixed within the combustor 44 and are ignited to produce combustion gas that is supposed to power the power turbine 46. The combustion gas expands through the power turbine 46 and impinges on the turbine blades (not shown), which causes the power turbine 46 to rotate.

The power turbine 46 includes an output shaft 64 that drives the power compressor 42, the load compressor 48, and the generators 24. The APU 22 is drivingly coupled to the generators 24 by the output shaft 64. It is to be appreciated that while FIG. 2 illustrates a single-shaft configuration where the output shaft 64 is coupled to the generators 24, in another example a double-shaft configuration may be used instead where separate output shafts are used to drive the generators 24 and the load compressor 48. In yet another example, an accessory gearbox may be used to drive the generators 24 and the load compressor 48. The load compressor 48 draws the ambient air A into an inlet 66 by a plurality of inlet guide vanes 67, and compresses the ambient air A. The compressed ambient air is supplied to the pneumatic loads 68 by a bleed air valve 70. It is to be appreciated that the example as shown in FIG. 3 does not include a load compressor 48 for providing bleed air to the pneumatic loads 68 in the aircraft 20. Instead, the APU 22 illustrated in FIG. 3 is used when the aircraft 20 uses electrically powered cabin air compressors (i.e., electrical motors drive the air compressors). In the example as shown in FIG. 3, only the generators 24 are connected to the APU 22. Instead of a load compressor, in one example an electrically driven compressor 72 is included in the aircraft 20 to provide the air required by the pneumatic loads 68.

Referring to FIGS. 1 and 2, the control module 28 instructs the APU 22 to operate based on a regulating signal 110 that is sent to the APU 22. In one example, the regulating signal 110 indicates a rotational speed of the output shaft 64 of the APU 22. However, the rotational speed of the output shaft 64 may also be controlled by other operational parameters as well. For example, the control module 28 controls a fuel flow rate to the combustor 44, an electrical power output 38 of the generators 24, or the output power of the output shaft 64 to achieve a particular rotational speed of the output shaft 64.

The control module 28 receives as input various ambient conditions and data pertaining to the operation of the aircraft 20. Specifically, the control module 28 receives as input one or more ambient signals indicative of an air density value, an ambient humidity signal, an aircraft velocity signal, a signal indicating the actual position of the air inlet door 25, an electrical load signal 76, a signal indicative of the rotational speed of the APU 22 (which is measured at the output shaft 64), a signal indicative of the output torque of the APU 22 (at the output shaft 64), and one or more flight deck commands. The input signals to the control module 28 may be sent from one or more sensors 84 on the aircraft 20 or, alternatively, through the other control modules 40 (e.g., the flight control module).

In one example, the ambient signal indicative of the air density value is a measured value. In other words, the air density value is measured directly by a sensing device. For example, an aneroid barometer may be used to directly measure the air density. Alternatively, in another example the air density value is a calculated value. Specifically, the ambient signals indicative of the air density value are a temperature signal and an altitude signal. The control module 28 receives as input an air density signal or, alternatively, the temperature signal and the altitude signal. The control module 28 calculates the air density value based on the temperature signal and altitude signal. Furthermore, in an example the measured air density value (i.e., the air density measured by the aneroid barometer) is compared with the calculated air density value (i.e., based on altitude and temperature) for redundancy. For example, if the sensor or sensors responsible for the measured value of the air density value are no longer operational, then the control module 28 calculates the air density signal based on the temperature signal and the altitude signal.

The electrical load signal 76 is determined by the control module 28 or, alternatively, by the other control modules 40 of the aircraft 20. The electrical load signal 76 is indicative of an electrical load demand on the generators 24. Characteristics such as excitation current and control are also included in the electrical load signal 76. In one example, the electrical load signal 76 includes a power transfer pending signal 86 that is received from a generator control module 78. The generator control module 78 is connected to one or more main generators 80 of the aircraft 20. The main generators 80 are driven by the output shaft 64 of the APU 22. The power transfer pending signal 86 indicates a power transfer from the main generators 80 of the aircraft 20 to the generators 24. It is to be appreciated that the main generators 80 of the aircraft 20 are driven by main engines 82 of the aircraft 20.

During the power transfer, the electrical load on the generators 24 may transition from a no-load condition (or a relatively light load) to a heavy load. The electrical load signal 76 includes the power transfer pending signal 86. Therefore, the control module 28 is configured to adjust the set position of the air inlet door 25 in anticipation the heavier loads created by the power transition from the main generators 80. Specifically, the control module 28 determines the effective area of the air inlet 29 required to maintain a substantially constant power output of the APU 22, and then determines the set position of the air inlet door 25 based on the effective area of the air inlet 29.

When the aircraft 20 is on the ground and the APU 22 is running, the air inlet door 25 is in the fully opened position. Alternatively, in another example the set position of the air inlet door 25 is based on a temperature value or an air density value of the ambient air. However, it is to be appreciated that aerodynamic considerations, such as drag, do not need to be considered when the aircraft 20 is on the ground. Therefore, there is no drag that is generated even when the air inlet door 25 is in the fully opened position.

When the aircraft 20 is in any stage of flight such as, but not limited to, taxi, takeoff, climb, cruise, descent, final approach, or landing, the air inlet door 25 is modulated. Specifically, the set position of the air inlet door 25 is adjusted for various ambient and operating parameters of the aircraft 20, which are constantly changing when the aircraft 20 is in flight. For example, when the aircraft 20 is in the climb stage of flight and is increasing in altitude, the air density and temperature decrease. However, even when the aircraft 20 is not in flight, the air density and temperature may still vary based on the elevation of an airport or terrain where the aircraft 20 is on ground. As an example, the air density at sea level is about thirty five percent denser at −40° C. (−40° F.) when compared to a temperature of about 48.9° C. (120° F.) at the same altitude. Thus, the set position of the air inlet door 25 is varied to compensate for the changing conditions, and the APU 22 generates a substantially constant power output. Specifically, the control module 28 adjusts the set position of the air inlet door 25 based on at least the air density value.

Figure 4:
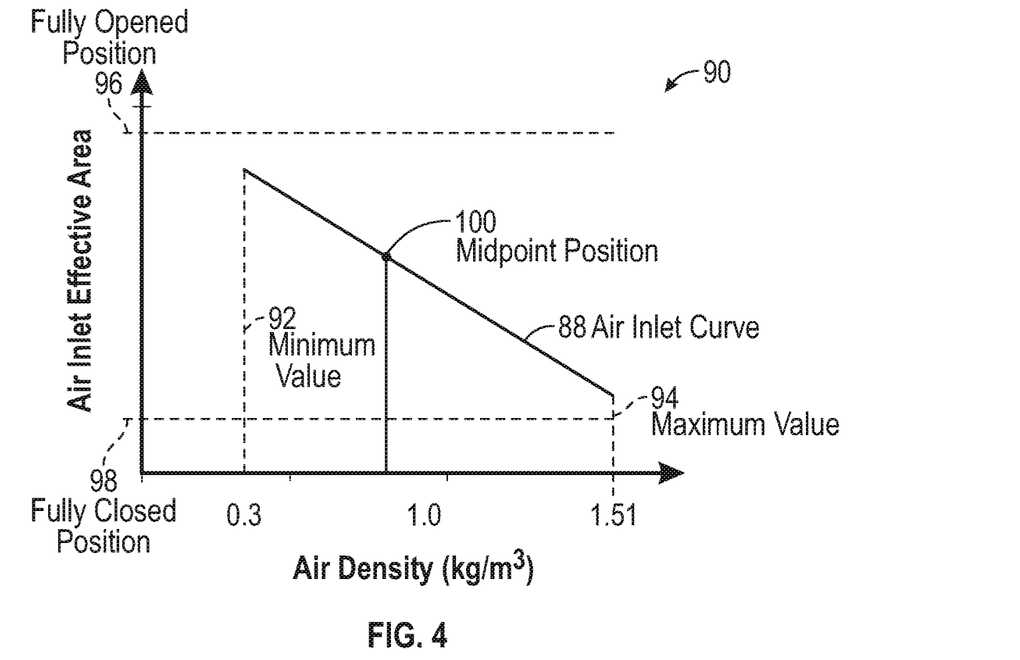
FIG. 4 is a graph illustrating an air inlet area curve based on air density according to an exemplary example.

FIG. 4 is a graph 90 illustrating an exemplary air inlet area curve 88 that represents a relationship between the variable size of the effective area of the air inlet 29 (FIG. 1) and the air density value. As the air density value approaches a minimum value 92 (e.g., 0.3 kg/m$^3$), the effective area of the air inlet 29 increases. Thus, the control module 28 instructs the actuator 26 to move the air inlet door 25 closer to the fully opened position, which in turn increases the mass flow rate m of the ambient air drawn by the power compressor 42. Similarly, when the air density value approaches a maximum value 94 (e.g., 1.51 kg/m$^3$), the effective area of the air inlet door 25 decreases. Thus, the control module 28 instructs the actuator 26 to move the air inlet door 25 closer to the fully closed position, which in turn decreases the mass flow rate ṁ of the ambient air provided to the power compressor 42.

The air inlet area curve 88 includes the effective area of the air inlet 29 when the air inlet door is in the fully opened position 96, the fully closed position 98, and a midpoint position 100. The midpoint position 100 of the air inlet door 25 is located between the fully opened position 96 and the fully closed position 98. The size of the effective area of the air inlet 29 is inversely proportional to the air density value. Therefore, the control module 28 determines the set position of the air inlet door 25 based on an inversely proportional relationship between the size of the effective area of the air inlet 29 and the air density value. It is to be appreciated that the air density value varies at about a 5 to 1 ratio between a cold day at sea level (1.51 kg/m$^3$) and at 40,000 feet altitude (0.3 kg/m$^3$). Therefore, conventional APU control systems generate about eighty percent less power at high altitude (i.e., 40,000 feet) when compared to the power output at sea level. However, the disclosed APU control system 18 compensates for the loss in air density at higher altitudes by increasing the effective area of the air inlet 29, which in turn increases the mass flow rate In the non-limiting example as shown in FIG. 4 the air inlet area curve 88 is linear. However, it is to be appreciated that FIG. 4 is merely exemplary in nature, and the relationship between the size of the effective area of the air inlet 29 (FIG. 1) and the air density value may be non-linear instead. The specific relationship between the size of the effective area of the air inlet 29 and the air density value is dependent upon various characteristics. For example, the specific relationship between the size of the effective area of the air inlet 29 and the air density value is based on the configuration of the air inlet 29 (i.e., scoop, NACA, etc.), the shape or geometry of the air inlet 29, the location of the air inlet 29 on the fuselage of the aircraft 20, the effect the air inlet 29 has on the boundary layer, and the ducting arrangement between the air inlet 29 and the power compressor 42. Furthermore, although only a single air inlet area curve 88 is shown in FIG. 4, it is to be appreciated that a family or a plurality of curves may be provided, where each curve corresponds to a different initial operating point of the APU 22 based on factors such as, but not limited to, electrical power loading on the APU 22.

Adjustment of the set position of the air inlet door 25 based on the air density value shall now be described. Referring to FIGS. 1, 2, and 4, the control module 28 receives one or more ambient signals indicative of the air density value and one or more power signals indicative of a specific amount of power generated by the APU 22. As mentioned about, the ambient signal is either a measured value indicative of the air density value (i.e., measured by an aneroid barometer) or, alternatively, the ambient signal is calculated based on a temperature signal and an altitude signal. In an example, the power signals include a speed signal that represents the rotational speed of the output shaft 64 and a torque signal indicative of the output torque at the output shaft 64. The control module 28 calculates the specific amount of power generated by the APU 22 based on the rotational speed and output torque of the output shaft 64.

Alternatively, the control module 28 calculates the power of the output shaft 64 from the voltage and current output of the generators 24.

The control module 28 determines the set position of the air inlet door 25 based on the air density value. Specifically, the control module 28 determines the size of the effective area of the air inlet 29 based on the air density value. The control module 28 then determines the set position of the air inlet door 25 based on the effective area of the air inlet 29 at the air density value. Once the set position of the air inlet door 25 is determined, the control module 28 instructs the actuator 26 to move the air inlet door 25 into the set position. When the air inlet door 25 is in the set position, the APU 22 continues to generate the specific amount of power. In other words, the control module 28 modifies the mass flow rate $\dot{m}$ supplied to the APU 22 by adjusting the set position of the air inlet door 25, which in turn results in the APU 22 maintaining a substantially constant power output, even as ambient and operational parameters change.

In addition to the air density value, the set position of the air inlet door 25 is also dynamically adjusted based on the electrical load demand on the generators 24. The control module 28 receives the electrical load signal 76. The control module 28 adjusts the set position of the air inlet door 25 based on the electrical load demand of the generators 24. It is to be appreciated that the set position of the air inlet door 25 is compensated for air density first. For example, in one approach the set position of the air inlet door 25 is compensated based on a high altitude of about 40,000 feet first. However, the electrical load demand of the generators 24 may be relatively low. For example, the generators 24 may only be loaded to about twenty percent of the power rating. Therefore, the air inlet door 25 is moved closer to the fully closed position based on the reduced load demand of the generators 24, which in turn increases vehicle fuel efficiency by reducing drag created by the air inlet door 25.

Figure 5:
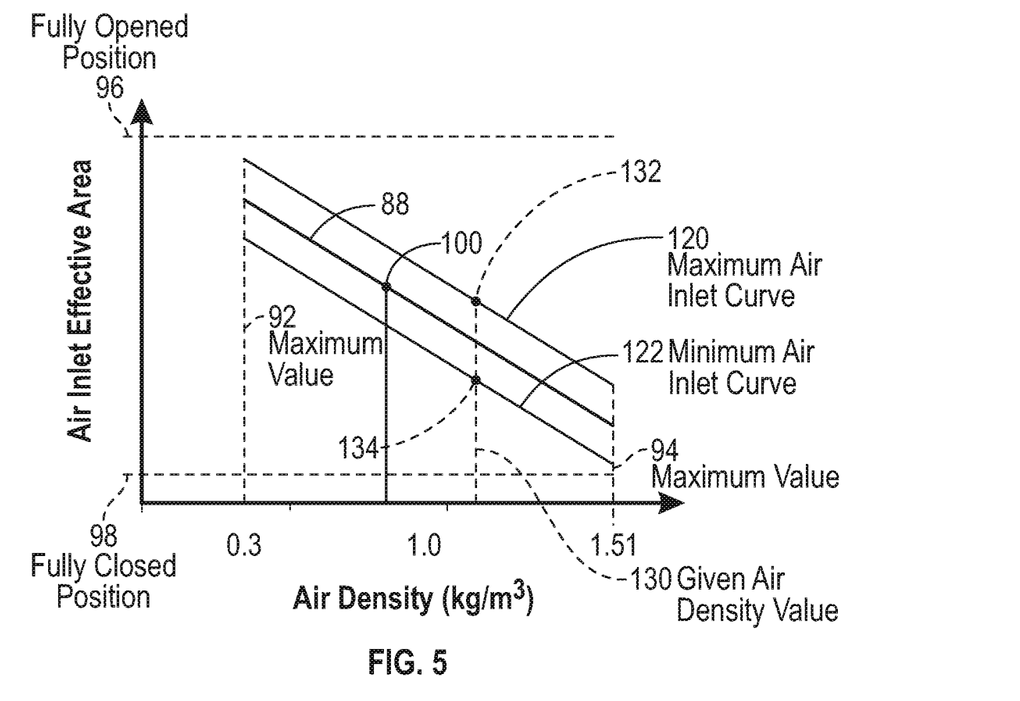
FIG. 5 is a graph illustrating the air inlet area curve shown in FIG. 4, where a positive and a negative compensation for power is shown according to an exemplary example.

FIG. 5 is an illustration of the air inlet area curve 88, an exemplary maximum air inlet area curve 120, and an exemplary minimum air inlet area curve 122. As explained below, the control module 28 is configured to move the air inlet door 25 closer to either the fully opened position 96 or the fully closed position 98 based on a proportional relationship between the electrical load demand and the size of the effective area of the air inlet 29. Specifically, the control module 28 is configured to move the air inlet door 25 closer to the fully opened position 96 to accommodate an increasing electrical power demand. Similarly, the control module 28 is configured to move the air inlet door 25 closer to the fully closed position 98 to accommodate a decreasing electrical power demand.

Referring to FIGS. 1, 2, and 5, in one example the control module 28 receives the electrical load signal 76, which indicates the electrical load demand. In addition to the electrical load signal 76, a transition between various stages of flight may also be used to determine the electrical load demand on the generators 24 as well. In some examples, the control module 28 determines the electrical load demand on the generators 24 is increasing. In response to determining the electrical load demand on the generators 24 is increasing, the control module 28 adjusts the set position of the air inlet door 25. More specifically, the control module 28 moves the air inlet door 25 closer to the fully opened position 96. Referring to FIG. 5, the control module 28 may continue to move the air inlet door 25 towards the fully opened position 96 at a given air density value 130 until the set position of the air inlet door 25 corresponds to a maximum area value 132 of the air inlet 29. That is, the control module 28 is configured to incrementally adjust the set position of the air inlet door 25 at a given air density value to maintain a specific amount of power currently being generated by the APU 22. The maximum area value 132 is located along the maximum air inlet area curve 120, and correlates to a maximum electrical power demand threshold.

In another example, the control module 28 determines the electrical load demand on generators 24 is decreasing. In response to determining the electrical load demand of the generators 24 is decreasing, the control module 28 adjusts the set position of the air inlet door 25. More specifically, the control module 28 moves the air inlet door 25 closer to the fully closed position 98. As seen in FIG. 5, the control module 28 may continue to move the air inlet door 25 closer to the fully closed position 98 at the given air density value 130 until the set position of the air inlet door 25 corresponds to a minimum area value 134. The fully closed position 98 of the air inlet door 25 is located along the minimum air inlet area curve 122, and correlates to a minimum electrical power demand threshold. Therefore, the control module 28 dynamically adjusts the set position of the air inlet door 25 at the given air density value 130 proportionally based on the magnitude of the electrical load demand, where the set position of the air inlet door 25 is adjustable between the fully opened position 96 and the fully closed position 98. At the given air density value 130, the fully closed position 98 of the air inlet door 25 corresponds to the minimum area value 134 and the fully opened position 96 of the air inlet door 25 corresponds to the maximum area value 132.

The values of the maximum electrical power demand threshold and the minimum electrical power demand threshold depend upon one or more of the following factors: a specific type or model of aircraft, a size of the generators 24, a maximum power output of the generators 24, a power factor of the generators 24, a load type of devices that are supplied with electrical power by the generators 24, and a combination of loads that result in the maximum electrical power demand and the minimum electrical power demand thresholds. Specifically, the types of loads that may be supplied electrical power by the generators 24 include resistive loads and reactive loads (i.e., loads that include an electrical motor and require more power to initially start). In one non-limiting example, the maximum electrical power demand threshold ranges from about sixty to about eighty percent of the maximum power output of the generators 24, and the minimum electrical power demand threshold ranges from about twenty to about forty percent of the maximum power output of the generators 24, however it is to be appreciated that these values are merely exemplary in nature. In still another example, the maximum and minimum electrical power demand thresholds are determined based on a look-up table. In yet another example, the maximum and minimum electrical power demand thresholds vary based on the flight plan of the aircraft 20.

In the non-limiting example as shown in FIG. 5, the maximum air inlet area curve 120 and the minimum air inlet area curve 122 both follow the air inlet area curve 88. In other words, both the maximum air inlet area curve 120 and the minimum air inlet area curve 122 vary in value by the same amount as the air inlet area curve 88. However, it is to be appreciated that the value of the maximum air inlet area curve 120 and the minimum air inlet area curve 122 may vary at different rates when compared to the air inlet area curve 88 as well. In other words, the maximum air inlet area curve 120, the minimum air inlet area curve 122, and the air inlet area curve 88 may each include a different slope. It is further appreciated that in another example the air inlet area curve 88 is non-linear, and the corresponding maximum air inlet area curve 120 and minimum air inlet area curve 122 are non-linear as well.

Figure 6:
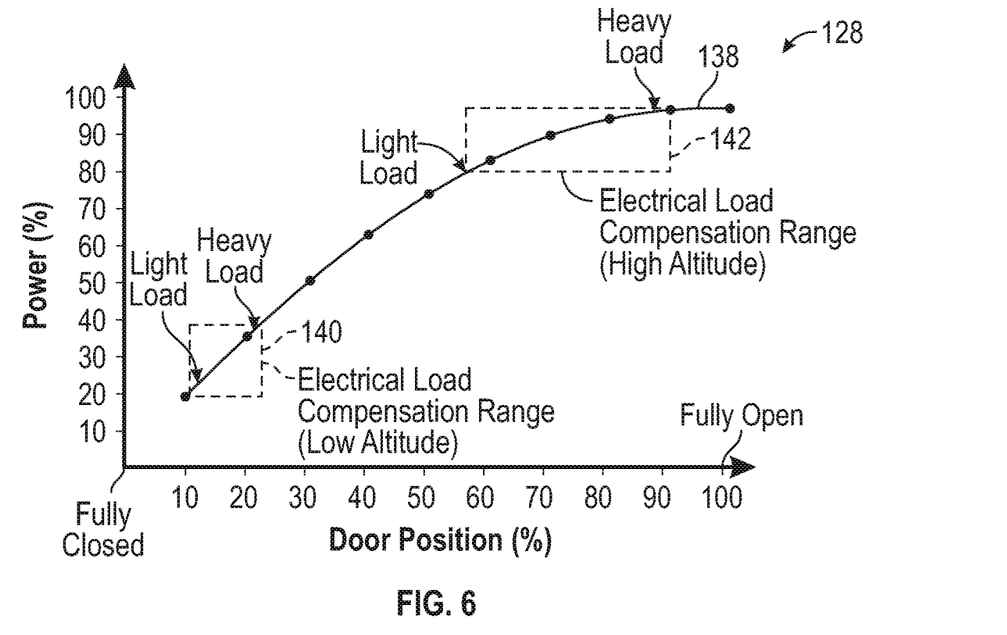
FIG. 6 is a graph illustrating an inlet area curve illustrating a relationship between the air inlet and APU power according to an exemplary example.

FIG. 6 is a graph 128 illustrating an exemplary air inlet area curve 138 of the APU 22. The air inlet area curve 138 is determined based on simulation and test data of the air inlet 29, ducting (not shown), and the APU 22. The x-axis of the graph 128 represents the set position of the air inlet door 25. Specifically, a zero percent door position corresponds to the fully closed position of the air inlet door 25, and a one hundred percent door position corresponds to the fully opened position of the air inlet door 25. It is to be appreciated that the air inlet area curve 138 shown in FIG. 6 is merely exemplary in nature, and the specific profile of the air inlet area curve 138 varies on factors such as, but not limited to, the performance of the APU 22 over load range as well as behavior of the air inlet 29 and the ducting as the velocity of the air changes.

In the example as shown in FIG. 6, at relatively lower altitudes 140 (e.g., about sea level to about 2,000 feet or 609.6 meters) as the air inlet door 25 is moved closer towards the fully opened position results in a greater increase in power output of the APU 22 when compared to an identical set position of the air inlet door 25 at relatively higher altitudes 142. Relatively higher altitudes include maximum altitude values, which include any value over about 35,000 feet (10,668 meters). For example, moving the set position of the air inlet door 25 from about ten percent to about twenty-three percent at the relatively lower altitudes 140 results in twenty percent more power output of the APU 22. In contrast, moving the set position of the air inlet door 25 by about forty percent at the relatively higher altitudes 142 results in the same power increase (i.e., twenty percent). The air inlet area curve 138 varies based on ambient conditions such as aircraft velocity and humidity. Therefore, the air inlet area curve 138 is re-calculated based on ambient conditions.

In another example, the control module 28 adjusts the set position of the air inlet door 25 based on a flight plan of the aircraft 20. In one example, the flight plan is stored in memory of the flight control module and is sent to the control module 28. The control module 28 is configured to calculate an anticipated or predicted electrical load based on the flight plan, where the predicted electrical load is based on flight control surface demands that modify hydraulic loads of the aircraft 20. The control module 28 adjusts the set position of the air inlet door 25 based on the predicted electrical load. For example, flight control surface commands such as, but not limited to, flap deploy and retract, thrust reverse, and auto-gap flap actuation increase or decrease the hydraulic load of an aircraft. Auto-gap flap actuation represents an automatic flap movement function that is based on an angle of attack, an air speed, and flap position of the aircraft 20.

It is to be appreciated that an electrically propelled aircraft may not include flight control surfaces such as aerodynamic flaps. Instead, the control module 28 is configured to calculate the anticipated load based on a change in speed of a plurality of electric motors, where the change in speed controls attitude or an angular velocity the aircraft 20. Specifically, an electrically propelled aircraft is manipulated based on thrust vectoring, which refers to an aircraft manipulating the direction of thrust from a motor to control the attitude or angular velocity. Thus, the control module 28 adjusts the set position of the air inlet door 25 based on the demand from the electric motors of the aircraft 20.

Figure 7:
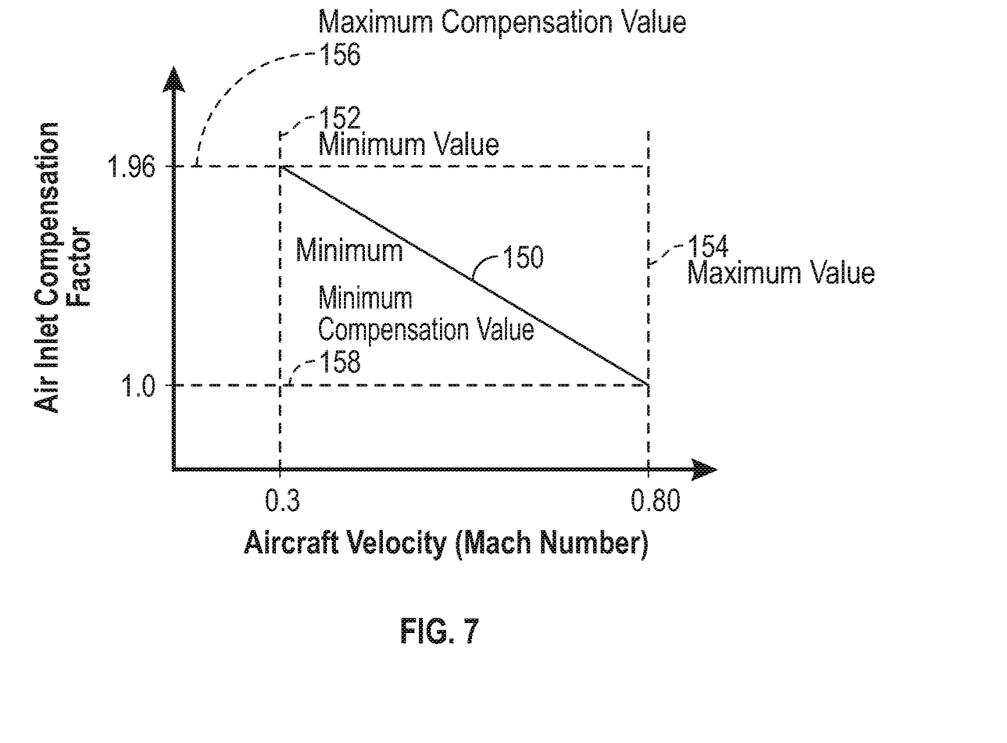
FIG. 7 is a graph illustrating the air inlet area curve shown in FIG. 4, where a positive and a negative compensation for aircraft velocity is shown according to an exemplary example.

In still another example, the control module 28 adjusts the set position of the air inlet door 25 based on the aircraft velocity. In one example, the aircraft velocity is compared to a speed of sound, and the aircraft velocity is expressed in Mach. FIG. 7 is an illustration of an exemplary velocity adjustment line 150 that illustrates a linear inversely proportional relationship between the aircraft velocity and the size of the effective area of the air inlet 29. As the aircraft velocity increases, then the air inlet door 25 is moved closer to the fully closed position, but the APU 22 still produces about the same power output. When the aircraft speed is at a maximum value 154 of 0.8 Mach, then the air inlet door 25 remains static. In other words, the size of the effective area of the air inlet 29 remains static, and therefore the air inlet door 25 does not move. Similarly, as the aircraft velocity decreases, then the size of the effective area of the air inlet 29 increases. Accordingly, the air inlet door 25 is moved closer to the fully opened position.

Referring to FIGS. 1, 2, and 7, in one example the control module 28 receives a velocity signal indicating the aircraft velocity compared to the speed of sound in air at a given air density value. The control module 28 adjusts the set position of the air inlet door 25 based on the aircraft velocity. The relationship between the aircraft velocity and the set position of the air inlet door 25 (i.e., the velocity adjustment line 150) is based on a ratio of mass flow of inlet air for the APU 22 between a minimum value 152 and the maximum value 154 of aircraft velocity. As seen in FIG. 7, the minimum value 152 of the aircraft velocity is about Mach 0.3 and the maximum value 154 of the aircraft velocity is about Mach 0.8. In the non-limiting example as shown, the ratio of mass flow of inlet air for the APU 22 is 1.96:1. Therefore, the inlet mass flow of the APU 22 is 1.96 times greater at Mach 0.8 when compared to the inlet mass flow at Mach 0.3. It is to be appreciated that ratio of 1.96:1 remains substantially constant even during changes in altitude. Therefore, the velocity adjustment line 150 remains the same regardless of altitude. It is also to be appreciated that the ratio of mass flow inlet air of 1.96:1 varies based on the maximum and minimum speeds of the aircraft 20.

As seen in FIG. 7, a maximum compensation value 156 of the air inlet door 25 correlates to the minimum value 152 of the aircraft velocity, and a minimum compensation value 158 of the air inlet door 25 correlates to the maximum value 154 of the aircraft velocity. In the non-limiting example as shown, the maximum compensation value 156 is 1.96, and the minimum compensation value 158 is 1.0. In an example, the control module 28 determines the aircraft velocity is less than the maximum value 154. In response to determining the aircraft velocity is less than the maximum value 154, the control module 28 adjusts the set position of the air inlet door 25 based on the linear inversely proportional relationship between the aircraft velocity and the size of the effective area of the air inlet 29. In contrast, in another example the control module 28 determines the aircraft velocity is at the maximum value 154. In response to determining the aircraft velocity is at the maximum value 154, the control module 28 determines the set position of the air inlet door 25 remains static. In other words, the set position of the air inlet door 25 is adjusted based on a factor of 1.0.

Referring to FIGS. 1 and 2, in still another example the set position of the air inlet door 25 is further adjusted based on ambient humidity. A proportional relationship exists between ambient humidity and the size of the effective area of the air inlet 29. Accordingly, as the ambient humidity increases, the air inlet door 25 moves towards the fully opened position proportionally. It is to be appreciated that the ambient humidity represents an absolute humidity, which is the total mass of water vapor present in a given volume or mass of air. The control module 28 receives the ambient humidity signal, which indicates an absolute humidity of air at a given air density. The control module 28 determines an absolute humidity based on the ambient humidity signal. The control module 28 then adjusts the set position of the air inlet door 25 based on the absolute humidity, where there is a proportional relationship between the absolute humidity and the size of the effective area of the air inlet 29. In an example, the humidity signal indicates the presence and quantity of precipitation such as rain, ice, or snow. The control module 28 also adjusts the set position of the air inlet door 25 based on the presence and quantity of precipitation as well.

Figure 8:
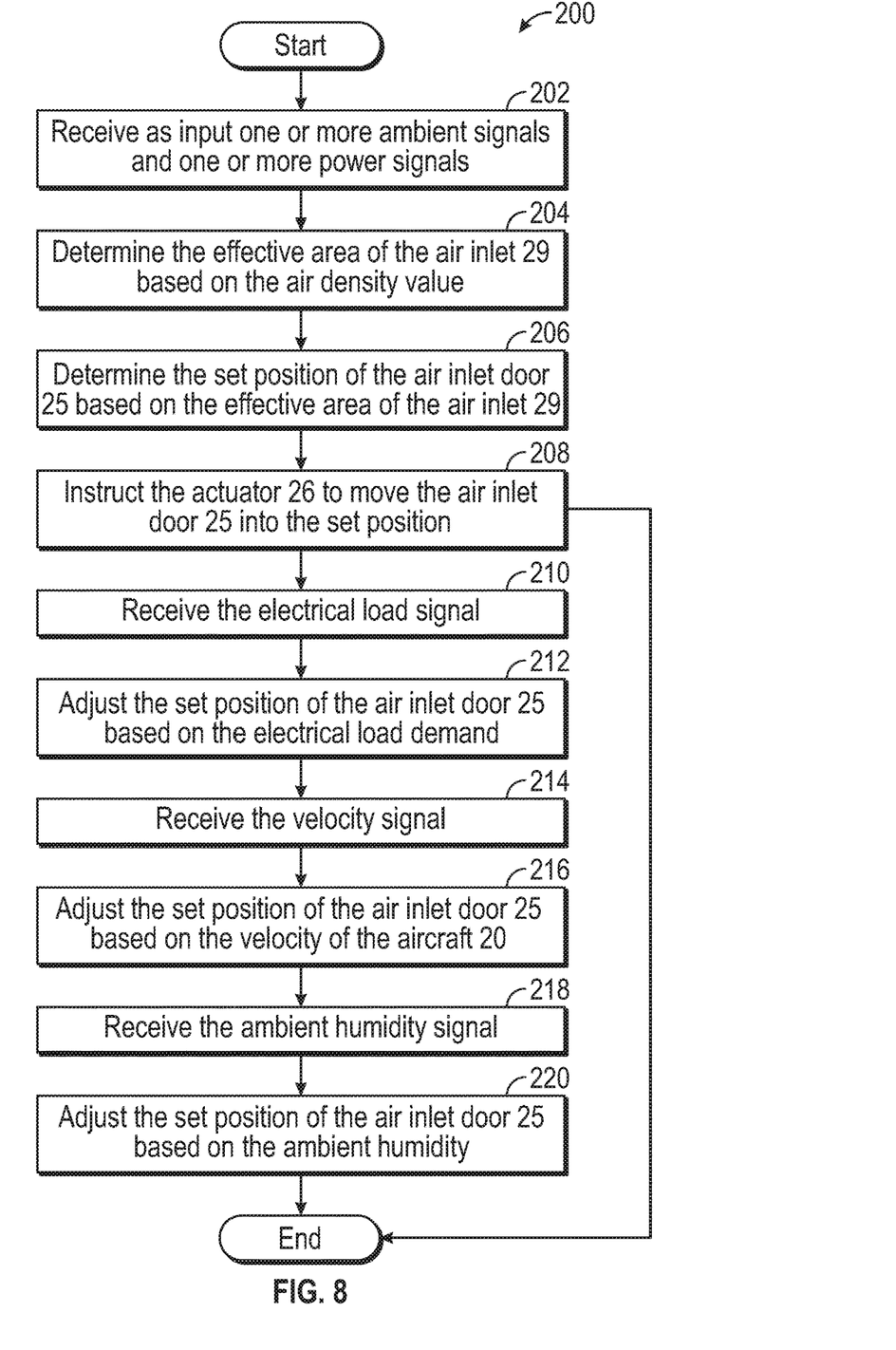
FIG. 8 is a process flow diagram illustrating a method for adjusting the position of the air inlet door according to an exemplary example.

FIG. 8 is a process flow diagram illustrating an exemplary method 200 of adjusting the set position of the air inlet door 25. It is to be appreciated that blocks 210, 212, 214, 216, 218, and 220 of method 200 are optional, and may be omitted in some examples. Referring generally to FIGS. 1, 2, 4, and 8, the method 200 begins at block 202. In block 202, the control module 28 receives as input one or more ambient signals indicative of the air density value and one or more power signals indicative of the specific amount of power generated by the APU 22. As mentioned above, the ambient signal is either a measured value (i.e., measured by an aneroid barometer) or a calculated value (i.e., based on altitude and temperature). In one example, the measured air density value is compared with the calculated air density value for redundancy. The method 200 may then proceed to block 204.

In block 204, the control module 28 determines the effective area of the air inlet 29 based on the air density value, where the mass flow of ambient air provided to the APU 22 is proportional to the size of the effective area of the air inlet 29. The method 200 may then proceed to block 206.

In block 206, the control module 28 determines the set position of the air inlet door based on the effective area of the air inlet 29. As an example, the air inlet area curve 88 shown in FIG. 4 may be used to determine the variable rotational speed of the APU based on the air density value. The method 200 may then proceed to block 208.

In block 208, the control module 28 instructs the actuator 26 to move the air inlet door 25 into the set position, where the APU 22 continues to generate the specific amount of power when operating at the variable rotational speed. In one example, the method 200 may then terminate. However, in some examples, the control module 28 also adjusts the set position of the air inlet door 25 based on the electrical load demand on the generators 24, the aircraft velocity, the humidity, or any combination of load, aircraft velocity, or humidity. It is to be appreciated that while FIG. 8 includes adjusting the set position of the air inlet door 25 in a specific sequence, no specific order is required. Therefore, in an example, the method 200 may then proceed to block 208.

In block 210, the control module 28 receives the electrical load signal 76, which is indicative of the electrical load demand by the one or more generators 24. The method 200 may then proceed to block 212.

In block 212, the control module 28 instructs the actuator 26 to adjust the set position of the air inlet door 25 based on the electrical load demand of the one or more generators 24, which is described above and shown in FIG. 5. The method 200 may then proceed to block 214.

In block 214, the control module 28 receives the velocity signal, which indicates the velocity of the aircraft 20 compared to the speed of sound in air. The method 200 may then proceed to block 216.

In block 216, the control module 28 instructs the actuator 26 to adjust the set position of the air inlet door 25 based on the velocity of the aircraft 20, which is described above and shown in FIG. 6. The method 200 may then proceed to block 218.

In block 218, the control module 28 receives the ambient humidity signal, which indicates the ambient humidity. The method 200 may then proceed to block 220.

In block 220, the control module 28 instructs the actuator 26 to adjust the set position of the air inlet door 25 based on the ambient humidity, which is described above. The method 200 may then terminate or return to block 202.

Referring generally to the figures, technical effects and benefits of the disclosed APU control system include a smaller, lightweight gas turbine that requires less fuel when compared to fixed-speed APUs. Specifically, the disclosed control system compensates for ambient and operating conditions that adversely affect the power output of the APU by increasing the mass flow of ambient air drawn by the APU. Therefore, a smaller sized gas turbine may be used to perform the same function as a heavier fixed-speed gas turbine. Additionally, the disclosed APU control system also dynamically adjusts the set position of the air inlet door based on the electrical load demand, which in turn improves the efficiency of the APU.

Figure 9:
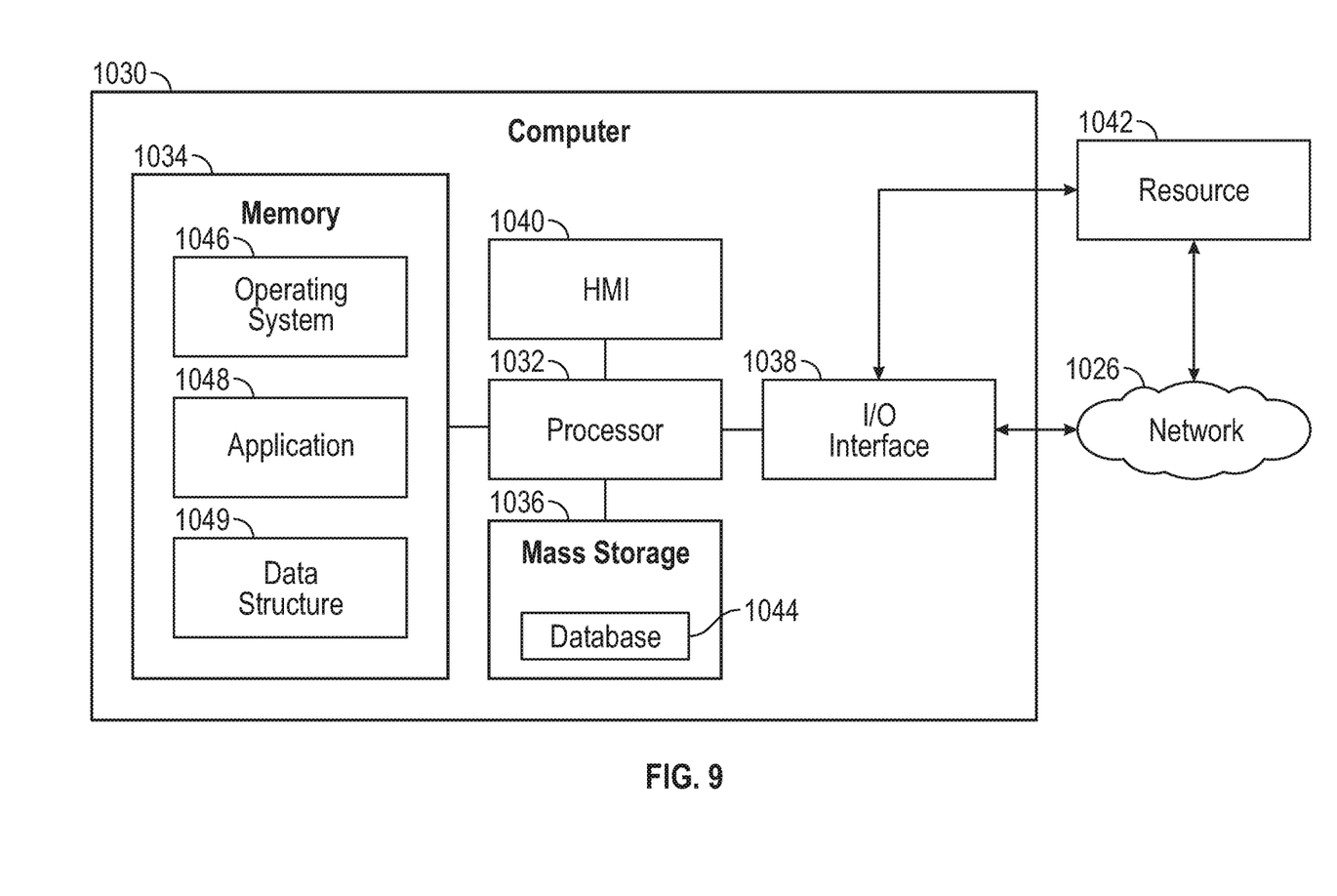
FIG. 9 is an illustration of a computer system used by the APU control system of FIG. 1 according to an exemplary example.

Referring now to FIG. 10, the APU control system 18 is implemented on one or more computer devices or systems, such as exemplary computer system 1030. The computer system 1030 includes a processor 1032, a memory 1034, a mass storage memory device 1036, an input/output (I/O) interface 1038, and a Human Machine Interface (HMI) 1040. The computer system 1030 is operatively coupled to one or more external resources 1042 via the network 1026 or I/O interface 1038. External resources may include, but are not limited to, servers, databases, mass storage devices, peripheral devices, cloud-based network services, or any other suitable computer resource that may be used by the computer system 1030.

The processor 1032 includes one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions that are stored in the memory 1034. Memory 1034 includes a single memory device or a plurality of memory devices including, but not limited to, read-only memory (ROM), random access memory (RAM), volatile memory, non-volatile memory, static random-access memory (SRAM), dynamic random-access memory (DRAM), flash memory, cache memory, or any other device capable of storing information. The mass storage memory device 1036 includes data storage devices such as a hard drive, optical drive, tape drive, volatile or non-volatile solid-state device, or any other device capable of storing information.

The processor 1032 operates under the control of an operating system 1046 that resides in memory 1034. The operating system 1046 manages computer resources so that computer program code embodied as one or more computer software applications, such as an application 1048 residing in memory 1034, may have instructions executed by the processor 1032. In an alternative example, the processor 1032 may execute the application 1048 directly, in which case the operating system 1046 may be omitted. One or more data structures 1049 also reside in memory 1034, and may be used by the processor 1032, operating system 1046, or application 1048 to store or manipulate data.

The I/O interface 1038 provides a machine interface that operatively couples the processor 1032 to other devices and systems, such as the network 1026 or external resource 1042. The application 1048 thereby works cooperatively with the network 1026 or external resource 1042 by communicating via the I/O interface 1038 to provide the various features, functions, applications, processes, or modules comprising examples of the disclosure. The application 1048 also includes program code that is executed by one or more external resources 1042, or otherwise rely on functions or signals provided by other system or network components external to the computer system 1030. Indeed, given the nearly endless hardware and software configurations possible, persons having ordinary skill in the art will understand that examples of the disclosure may include applications that are located externally to the computer system 1030, distributed among multiple computers or other external resources 1042, or provided by computing resources (hardware and software) that are provided as a service over the network 1026, such as a cloud computing service.

The HMI 1040 is operatively coupled to the processor 1032 of computer system 1030 in a known manner to allow a user to interact directly with the computer system 1030. The HMI 1040 may include video or alphanumeric displays, a touch screen, a speaker, and any other suitable audio and visual indicators capable of providing data to the user. The HMI 1040 also includes input devices and controls such as an alphanumeric keyboard, a pointing device, keypads, pushbuttons, control knobs, microphones, etc., capable of accepting commands or input from the user and transmitting the entered input to the processor 1032.

A database 1044 may reside on the mass storage memory device 1036 and may be used to collect and organize data used by the various systems and modules described herein. The database 1044 may include data and supporting data structures that store and organize the data. In particular, the database 1044 may be arranged with any database organization or structure including, but not limited to, a relational database, a hierarchical database, a network database, or combinations thereof. A database management system in the form of a computer software application executing as instructions on the processor 1032 may be used to access the information or data stored in records of the database 1044 in response to a query, where a query may be dynamically determined and executed by the operating system 1046, other applications 1048, or one or more modules.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. An auxiliary power unit (APU) control system for an aircraft, the APU control system including an APU, an air inlet having an effective area, an air inlet door moveable to vary a size of the effective area of the air inlet, and an actuator configured to move the air inlet door into a set position, the APU control system comprising:
   one or more processors; and
   a memory coupled to the one or more processors, the memory storing data comprising a database and program code that, when executed by the one or more processors, causes the APU control system to:
   receive one or more ambient signals indicative of an air density value and one or more power signals indicative of a specific amount of power generated by the APU;
   determine the size of the effective area of the air inlet based on the air density value, wherein a mass flow of ambient air provided to the APU is proportional to the size of the effective area of the air inlet;
   determine the set position of the air inlet door based on the size of the effective area of the air inlet; and
   instruct the actuator to move the air inlet door into the set position, wherein the APU continues to generate the specific amount of power when the air inlet door is in the set position.

2. The APU control system of claim 1, wherein the air inlet door is moveable by the actuator between a fully opened position, a plurality of partially opened positions, and a fully closed position.

3. The APU control system of claim 2, wherein the mass flow of ambient air provided to the APU is substantially zero when the air inlet door is in the fully closed position.

4. The APU control system of claim 2, wherein the size of the effective area of the air inlet ranges between a maximum area value and a minimum area value, and wherein the maximum area value of the air inlet corresponds to the fully opened position of the air inlet door and the minimum area value corresponds to the fully closed position of the air inlet door.

5. The APU control system of claim 1, wherein the one or more processors execute instructions to:
   receive a temperature signal and an altitude signal; and
   determine the air density value based on the temperature signal and the altitude signal.

6. The APU control system of claim 1, comprising one or more generators driven by an output of the APU, wherein the one or more processors execute instructions to:
   receive an electrical load signal, wherein the electrical load signal is indicative of an electrical load demand on the one or more generators; and
   instruct the actuator to adjust the set position of the air inlet door based on the electrical load demand on the one or more generators.

7. The APU control system of claim 6, wherein the one or more processors further execute instructions to:
   determine the electrical load demand on the one or more generators is either increasing or decreasing;
   in response to determining the electrical load demand on the one or more generators is increasing, instruct the actuator to move the air inlet door closer to a fully opened position based on a proportional relationship between the electrical load demand and the size of the effective area of the air inlet; and
   in response to determining the electrical load demand on the one or more generators is decreasing, instruct the actuator to move the air inlet door closer to a fully closed position based on the proportional relationship between the electrical load demand and the size of the effective area of the air inlet.

8. The APU control system of claim 6, wherein the one or more processors further execute instructions to:
   dynamically adjust the set position of the air inlet door at a given air density value proportionally to a magnitude of the electrical load demand, wherein the set position of the air inlet door is adjustable into a plurality of partially opened positions.

9. The APU control system of claim 1, wherein the memory stores a flight plan of the aircraft, and wherein the one or more processors execute instructions to:
calculate a predicted electrical load based on the flight plan, wherein the predicted electrical load is based on flight control surface demands that modify hydraulic loads of the aircraft; and
adjust the set position of the air inlet door based on the predicted electrical load.

10. The APU control system of claim 1, wherein the memory stores a flight plan of the aircraft, and wherein the one or more processors execute instructions to:
calculate a predicted electrical load based on the flight plan, wherein the predicted electrical load is based on a change in speed of a plurality of electric motors, and wherein the change in speed of the plurality of electric motors controls attitude of the aircraft or an angular velocity of the aircraft; and
adjust the set position of the air inlet door based on the predicted electrical load.

11. The APU control system of claim 1, wherein the one or more processors execute instructions to:
receive a velocity signal indicating an aircraft velocity compared to a speed of sound in air at a given air density value;
determine the aircraft velocity is less than a maximum value; and
in response to determining the aircraft velocity is less than the maximum value, adjust the set position of the air inlet door based on a linear inversely proportional relationship between the aircraft velocity and the size of the effective area of the air inlet.

12. The APU control system of claim 1, wherein the one or more processors execute instructions to:
receive a velocity signal indicating an aircraft velocity compared to a speed of sound in air at a given air density value;
determine the aircraft velocity is at a maximum value; and
in response to determining the aircraft velocity is at the maximum value, determine the set position of the air inlet door remains static based on a linear inversely proportional relationship between the aircraft velocity and the size of the effective area of the air inlet.

13. The APU control system of claim 1, wherein the one or more processors execute instructions to:
receive an ambient humidity signal indicating an absolute humidity of air at a given air density;
determine the absolute humidity of air based on the ambient humidity signal; and
adjust the set position of the air inlet door based on the absolute humidity, wherein a proportional relationship exists between the absolute humidity and the size of the effective area of the air inlet.

14. An aircraft including an APU control system, the aircraft comprising:
an APU;
an air inlet having an effective area;
an air inlet door moveable to vary a size of the effective area of the air inlet;
an actuator configured to move the air inlet door into a set position, wherein the actuator is configured to move the air inlet door between a fully opened position, a plurality of partially opened positions, and a fully closed position;
one or more processors; and
a memory coupled to the actuator and the one or more processors, the memory storing data comprising a database and program code that, when executed by the one or more processors, causes the APU control system to:
receive one or more ambient signals indicative of an air density value and one or more power signals indicative of a specific amount of power generated by the APU;
determine the size of the effective area of the air inlet based on the air density value, wherein a mass flow of ambient air provided to the APU is proportional to the size of the effective area of the air inlet, and wherein the mass flow of ambient air provided to the APU is substantially zero when the air inlet door is in the fully closed position;
determine the set position of the air inlet door based on the size of the effective area of the air inlet; and
instruct the actuator to move the air inlet door into the set position, wherein the APU continues to generate the specific amount of power when the air inlet door is in the set position.

15. The aircraft of claim 14, comprising one or more generators driven by an output of the APU, wherein the one or more processors execute instructions to:
receive an electrical load signal, wherein the electrical load signal is indicative of an electrical load demand on the one or more generators; and
instruct the actuator to adjust the set position of the air inlet door based on the electrical load demand on the one or more generators.

16. A method of adjusting a set position of an air inlet door that is part of an APU control system, the method comprising:
receiving, by a computer, one or more ambient signals indicative of an air density value and one or more power signals indicative of a specific amount of power generated by an APU;
determining, by the computer, an effective area of an air inlet based on the air density value, wherein a mass flow of ambient air provided to the APU is proportional to a size of the effective area of the air inlet;
determining the set position of the air inlet door based on the effective area of the air inlet, wherein the air inlet door is moveable to vary the size of the effective area of the air inlet; and
instructing an actuator to move the air inlet door into the set position, wherein the APU continues to generate the specific amount of power when the air inlet door is in the set position.

17. The method of claim 16, further comprising:
receiving a temperature signal and an altitude signal; and
determining the air density value based on the temperature signal and the altitude signal.

18. The method of claim 16, further comprising:
receiving an electrical load signal, wherein the electrical load signal is indicative of an electrical load demand on one or more generators drivingly coupled to the APU; and
instructing the actuator to adjust the set position of the air inlet door based on the electrical load demand on the one or more generators.

19. The method of claim 18, further comprising:
determining the electrical load demand on the one or more generators is increasing or decreasing;
in response to determining the electrical load demand on the one or more generators is increasing, instructing the actuator to move the air inlet door closer to a fully opened position based on a proportional relationship between the electrical load demand and the size of the effective area of the air inlet; and in response to determining the electrical load demand on the one or more generators is decreasing, instructing the actuator to move the air inlet door closer to a fully closed position based on the proportional relationship between the electrical load demand and the size of the effective area of the air inlet.

20. The method of claim 16, further comprising:

receiving a velocity signal indicating an aircraft velocity compared to a speed of sound in air at a given air density value;

determining the aircraft velocity is less than a maximum value; and in response to determining the aircraft velocity is less than the maximum value, adjusting the set position of the air inlet door based on a linear inversely proportional relationship between the aircraft velocity and the size of the effective area of the air inlet.

* * * * *